United States Patent
Charles

(10) Patent No.: US 10,086,371 B2
(45) Date of Patent: Oct. 2, 2018

(54) FLUIDIC CARD COMPRISING A FLUIDIC CHANNEL PROVIDED WITH AN OPENING RESEALABLE BY MEANS OF A FLEXIBLE FILM

(71) Applicant: Commissariat a l'energie atomique et aux energies alternatives, Paris (FR)

(72) Inventor: Raymond Charles, Saint Jean de Moirans (FR)

(73) Assignee: Commisariat à l'énergie atomique et aux énergies alternatives, Paris (FR)

(*) Notice: Subject to any disclaimer, the term of this patent is extended or adjusted under 35 U.S.C. 154(b) by 0 days.

(21) Appl. No.: 14/893,209

(22) PCT Filed: May 28, 2014

(86) PCT No.: PCT/EP2014/061179
§ 371 (c)(1),
(2) Date: Nov. 23, 2015

(87) PCT Pub. No.: WO2014/191519
PCT Pub. Date: Dec. 4, 2014

(65) Prior Publication Data
US 2016/0121328 A1    May 5, 2016

(30) Foreign Application Priority Data
May 30, 2013    (FR) ..................... 13 54950

(51) Int. Cl.
*B01L 99/00* (2010.01)
*B01L 3/00* (2006.01)
(Continued)

(52) U.S. Cl.
CPC ... *B01L 3/502715* (2013.01); *B01L 3/502738* (2013.01); *B01L 3/502746* (2013.01);
(Continued)

(58) Field of Classification Search
CPC ....... B01L 2300/123; B01L 2400/0655; B01L 2400/0638
See application file for complete search history.

(56) References Cited

U.S. PATENT DOCUMENTS 5,628,411 A * 5/1997 Mills ..................... B07C 5/3425
                                                          209/644
5,863,502 A    1/1999 Southgate et al.
(Continued)

FOREIGN PATENT DOCUMENTS

EP    1 331 538    7/2003
WO    97 27324    7/1997
(Continued)

OTHER PUBLICATIONS

U.S. Appl. No. 14/110,603, filed Oct. 8, 2013, Charles et al.
(Continued)

*Primary Examiner* — Paul Sang Hwa Hyun
(74) *Attorney, Agent, or Firm* — Oblon, McClelland, Maier & Neustadt, L.L.P.

(57) ABSTRACT

A fluidic card including a rigid support and a fluidic channel at least partially formed in the rigid support. The fluidic channel includes an opening coming out on an outer surface of the rigid support, and the fluidic card further includes a flexible film disposed on the outer surface of the rigid support, at least at the opening of the fluidic channel, the flexible film configured to be deformed between a closed position in which it enables the fluidic channel to be closed to prevent a fluid flow from the fluidic channel through the opening and an open position in which it allows presence of a fluid flow space from the fluidic channel through the opening.

7 Claims, 3 Drawing Sheets

(51) Int. Cl.
*F16K 99/00* (2006.01)
*B01L 9/00* (2006.01)

(52) U.S. Cl.
CPC ...... *F16K 99/0015* (2013.01); *F16K 99/0059* (2013.01); *B01L 9/527* (2013.01); *B01L 2200/025* (2013.01); *B01L 2200/027* (2013.01); *B01L 2300/0816* (2013.01); *B01L 2300/0887* (2013.01); *B01L 2300/123* (2013.01); *B01L 2400/0487* (2013.01); *B01L 2400/0633* (2013.01); *B01L 2400/0638* (2013.01); *B01L 2400/0655* (2013.01); *F16K 2099/0084* (2013.01)

(56) References Cited

U.S. PATENT DOCUMENTS

| | | | |
|---|---|---|---|
| 2001/0054702 A1* | 12/2001 | Williams | B01F 5/0646 251/61 |
| 2003/0096423 A1 | 5/2003 | Ryan et al. | |
| 2003/0143122 A1 | 7/2003 | Sander | |
| 2004/0209354 A1* | 10/2004 | Mathies | B01F 5/10 435/287.2 |
| 2006/0076068 A1 | 4/2006 | Young et al. | |
| 2008/0250633 A1 | 10/2008 | Burger et al. | |
| 2008/0311665 A1 | 12/2008 | Ryan et al. | |
| 2009/0056822 A1 | 3/2009 | Young et al. | |
| 2009/0056861 A1 | 3/2009 | Young et al. | |
| 2011/0041935 A1 | 2/2011 | Zhou et al. | |
| 2013/0105017 A1 | 5/2013 | Zhou et al. | |
| 2014/0037515 A1 | 2/2014 | Charles et al. | |
| 2014/0246618 A1 | 9/2014 | Zhou et al. | |

FOREIGN PATENT DOCUMENTS

| | | |
|---|---|---|
| WO | 02 41994 | 5/2002 |
| WO | 2007 114687 | 10/2007 |
| WO | 2012 136943 | 10/2012 |

OTHER PUBLICATIONS

International Search Report dated Sep. 19, 2014 in PCT/EP14/061179 Filed May 28, 2014.
French Search Report dated Jan. 27, 2014 in Application No. FR 1354950 Filed May 30, 2013.

* cited by examiner

FLUIDIC CARD COMPRISING A FLUIDIC CHANNEL PROVIDED WITH AN OPENING RESEALABLE BY MEANS OF A FLEXIBLE FILM

TECHNICAL FIELD

The present invention relates to the field of fluidic cards, especially intended to be connected to instrumented supports for in vitro diagnoses. It also relates to the field of techniques related to controlling valves present on such fluidic cards.

The invention has applications in many fields, such as amongst other the fields of medical research, biology and pharmaceutical industry.

The invention thus provides a fluidic card including a fluidic valve, an assembly including such a fluidic card and a card support for controlling the fluidic valve, as well as a method for controlling at least one valve of a fluidic card implemented by means of such an assembly.

STATE OF PRIOR ART

An exemplary fluidic card that can be associated with a sealed connecting device of this card to one or more instruments in order to perform in vitro diagnoses is already known from the international application WO 2012/136943 A1.

Such a fluidic card 300 is shown in FIG. 1. The card 300 includes at least one fluidic (or microfluidic) channel 302 at its surface and/or in its thickness. The thickness of the card 300 is defined along the axis $\vec{k}'$ of an orthogonal reference frame (O', i', j', k'), its length being along the axis $\vec{j}'$ and its width along the axis $\vec{i}'$.

The fluidic channel 302 is linked to two openings or mouths 304 coming out on a face 306 of the card, referred to as a connecting face 306, parallel to another face 308, referred to as a bearing face 308. The mouths 304 are located on the part of the connecting face 306 closest to a front face 314, located in a plane parallel to the plane i'k' in FIG. 1. This front face 314 is parallel to a back face 310 of the card 300. A film, for example of a plastic material, preferably biocompatible, can cover the mouths 304 of the fluidic channel 302, and enables the mouths to be protected in order to prevent material from intruding in the fluidic channel 304, before connecting the card 300 to a connecting device. The card 300 can then be used in various environments, without any particular conditions of cleanliness.

FIGS. 2A and 2B show such an exemplary connecting device of a fluidic card 300 such as shown in FIG. 1, respectively without and with the presence of the card 300. The connecting device includes a base or base plate 10 which itself includes a lower surface or bearing surface of the whole device 12, and an upper surface or first surface 14, on which the fluidic card 300 can bear during the use of the device.

The device is further circumscribed at its end by two front 20 and back 30 walls disposed substantially perpendicular to each surface 12 and 14. The surface 22 of the front wall 20, facing the inside of the device, is referred to as a front stop 22, and the surface 32 of the back wall, adjacent to the first surface 14, is referred to as a back stop 32. To the upper part of the front stop 22, is connected an upper wall or upper side plate 40, substantially parallel to the bearing surface 12, to the first surface 14 and the bottom surface 16, and which includes at least one channel 44 enabling the connection between a mouth 304 of the card 300 and an instrument for treating or analysing fluids (not shown in the FIGS. 2A and 2B). The card 300 is thus intended to be placed on the first surface 14, as shown in FIG. 2B, such that its connecting face 306 is in contact with channels 44 linked to one or more instruments. Holding means 60 exert a force on the card 300 when the latter is connected to the device, and then hold pressed against the first surface 14 of the device, which by leverage, enables the card to bear against the channels 44.

In order to be able to control the operation of at least one fluidic (or microfluidic) valve likely to be present on the fluidic card 300, especially at the fluidic channel 302, by means of the support formed by the connecting device, mechanical means fixed on this device are provided to induce a deformation at the valve.

Thus, the first surface 14 can be passed through by one or more mobile studs 80 at holes 82 (see FIG. 2A). Displacing means 84 enable the stud 80 to have a translation movement perpendicular to the first surface 14 and/or to the bottom surface 16 so as to exert or release a pressure localized on a flexible surface of the card 300, for example a valve-forming tube or membrane. This deformation then makes it possible to narrow the cross-section 88 of the fluidic channel 302, or even to block this channel 302 (see FIG. 2B). The translation movement can be controlled by an operator and/or means such as an automaton in interaction with an interface 86.

Nevertheless, this solution of controlling a valve of a fluidic card according to a prior art is not fully satisfactory. Indeed, the use of several mechanical parts passing through the support in order to manage the operation of the valve is constraining, especially in terms of maintenance due to the wear resulting from the movements of the parts relative to each other. Furthermore, the solution set forth above leads to significant overall dimensions in the support to accommodate the mechanical systems and control means thereof, hence a manufacture that can be complex. Furthermore, the rigid head of the stud 80 (or jack) bearing against a flexible surface of the card 300 can induce marking or breaking risks at the valve. Finally, the use of such a mechanical system for managing the operation of a fluidic card valve involves the achievement of a very accurate alignment between the stud (or jack) and the valve.

DISCLOSURE OF THE INVENTION

The aim of the invention is to at least partially meet the abovementioned needs and drawbacks related to the prior art embodiments.

The purpose of the invention is especially to provide an alternative solution to design and enable controlling the operation of at least one valve of a fluidic card.

The object of the invention is thus, according to one of its aspects, a fluidic card including a rigid support and a fluidic channel at least partially formed in the rigid support, characterized in that the fluidic channel includes an opening coming out on the outer surface of the rigid support, and in that the fluidic card further includes a flexible film disposed on the outer surface of the rigid support, at least at the opening of the fluidic channel, the flexible film being able to be deformed between a closed position in which it enables the fluidic channel to be closed in order to prevent a fluid flow from the fluidic channel through the opening and an open position in which it allows the presence of a fluid flow space from the fluidic channel through the opening.

The outer surface of the rigid support thus constitutes an outer surface of the fluidic card.

The fluidic card can also be referred to as a microfluidic or expandable card. The assembly formed by the flexible film disposed on the opening of the fluidic channel constitutes a valve of the fluidic card. The deformation of the flexible film between the open and closed positions enables this valve to be regulated. The valve of the fluidic card is therefore included in the latter, the assembly being expendable (i.e. disposable).

Deformation of the flexible film can be made under the action of an outer means, especially a pneumatic means, to achieve the closed position. This deformation is advantageously reversible to allow the flexible film to return to the open position. Activating or controlling the valve of the fluidic card can thus be made by actuating and releasing the flexible film of the valve.

Thanks to the invention, controlling the operation of a valve of a fluidic card can be achieved with a great reliability and a great simplicity. The overall dimensions are reduced to the minimum, especially at the card support (described latter), and the absence of movement between mechanical parts enables any wear and therefore any maintenance to be avoided. Furthermore, the alignment between the fluidic card and the card support, to then enable the deformation of the flexible film and switching from a position (closed or open) to the other, does not require a great accuracy. Moreover, a tearing risk of a flexible part of the valve, especially of the flexible film, can be avoided since the invention does not require the use of a mechanical jack.

The fluidic card according the invention can further include one or more of the following characteristics taken alone or according to any possible technical combination.

The fluidic card can include a plurality of fluidic channels, forming together a fluidic circuit of the card. All or at least some of such fluidic channels can include a fluidic channel opening on which a flexible film is disposed to form a fluidic card valve according to the invention.

The phrase "open position" must be understood in the broad sense. Thus, it refers to any position in which fluid from the fluidic channel can flow through the opening. The phrase "open position" can then correspond to different degrees of opening, for example a semi-open position, that is a median deformation of the flexible film or also a median pressure exerted on the flexible film, or a totally open position, that is a non-existent deformation of the flexible film or even an absence of pressure exerted on the flexible film. Particularly, the totally open position enables a maximum flow of fluid from the fluidic channel through the opening of the fluidic channel. The totally open position also corresponds to the rest (or equilibrium) position of the flexible film. The degree of opening of the open position can be adjusted as a function of the deformability (i.e. of the pressure) applied to the flexible film.

When switching from the open position to the closed position, the displacement of the flexible film can be tiny. For example, when switching from the totally open position to the closed position, the flexible film can be displaced by a distance equal to or lower than 100 µm.

The opening of the fluidic channel can extend along its largest dimension substantially parallel to the flexible film.

The opening of the fluidic channel can have any shape, and for example an annular shape.

The fluidic card can further include a closing seal disposed between the flexible film and the opening of the fluidic channel.

The closing seal can enable the closing of the opening of the fluidic channel to be facilitated during the deformation of the flexible film from the open position to the closed position.

Advantageously, the closing seal is secured to the flexible film, being in particular bonded to the flexible film.

The closing seal is preferably a flat seal. Alternatively, the closing seal can be a ring seal or an O-ring, especially in the case of a significant sizing of the opening of the fluidic channel.

The opening of the fluidic channel can include a boss, especially formed all around the fluidic channel. The boss can be annular.

The boss advantageously constitutes a relief in the opening of the fluidic channel, on which the closing seal can bear in the closed position of the flexible film. The closing seal can therefore be fixed, especially by bonding, to the flexible film, so as to be facing the boss made in the opening of the fluidic channel.

The boss can be a relief formed on the rigid support of the fluidic card, or also be constituted by an added element on the rigid support of the fluidic card.

The opening can include a fluid flow channel from the fluidic channel enabling the flow of fluid exiting from the fluidic channel in the open position of the flexible film.

The flow channel can be formed in the rigid support of the fluidic card, especially by machining.

The flow channel can be made juxtaposed to the boss of the opening of the fluidic channel. Particularly, machining the flow channel can enable the boss to be formed in the rigid support of the fluidic card. The flow channel can be located all around the boss of the opening.

The flow channel can further come out on another fluidic channel of the fluidic card, for example formed on the rigid support of the card so as to extend along its largest dimension substantially parallel to the flexible film.

The rigid support of the fluidic card can be made in one piece.

The fluidic channel can substantially extend from one rim to the other of the rigid support of the fluidic card, especially along the thickness of the rigid support.

The fluidic card can be connected to at least one instrument, especially for performing in vitro diagnoses, such as for example a measuring apparatus, a heating element, a mechanical actuator or a pump. To do so, the fluidic card according to the invention can be used for example in combination with a connecting device such as described in the international application WO 2012/136943 A1, already previously commented on.

The fluidic card can include complex means, for example a biochip or a reaction chamber.

The fluidic card can have dimensions similar or identical to the dimensions of a credit card. Its thickness can be sufficient to contain at least one fluidic channel, and possibly a fluidic network (including several fluidic channels).

The length and/or the width of the fluidic card can be between a few centimeters and a few decimeters, for example between 1 cm and 10 cm, or even 20 cm. The thickness of the fluidic card can be between a few millimeters and few centimeters, for example between, on the one hand, 1 mm or 5 mm and, on the other hand, 1 cm or 2 cm.

The object of the invention is also, according to another aspect, an assembly, characterized in that it includes a fluidic card such as previously defined and a card support, able to enable the flexible film to be deformed and on which the fluidic card is intended to be pressed.

The fluidic card can thus be placed on the card support, and the card support can constitute an outer means enabling the fluidic card valve to be controlled, and especially the flexible film placed on the opening of the fluidic channel of the fluidic card to be deformed.

The fact that the fluidic card has an outer surface and that the flexible film is disposed on this outer surface can enable the flexible film to be actuated by the card support, distinct from the card, when the fluidic card is disposed on the outer surface of the card support. The card support is then intended to receive a plurality of similar fluidic cards, each card being placed on the card support, and then removed when the operation is performed.

Preferentially the outer surfaces of the fluidic card and of the card support are substantially parallel to each other.

It is thus possible to have a fluidic card which is simple and inexpensive to make, since the flexible film can be disposed on the outer surface of the fluidic card, for example by bonding. The more expensive fluidic control means can be transferred on the card support, and not integrated into the fluidic card.

Particularly, the flexible film can be disposed on the surface of the fluidic card after etching fluidic channels in the card, these fluidic channels coming out on the outer surface of the card. The flexible film thus constitutes a wall of these fluidic channels provided in the card. It also enables a fluidic channel to be closed and opened when it is deformed by an outer actuating means.

The card support can include means for actuating the fluidic card valve, in particular a control fluidic channel coming out on the surface of the card support in which a pressure fluid, especially a gas, is able to travel in order to enable the flexible film of the fluidic card to be deformed.

Thus, in order to enable the fluidic card valve to be controlled, or in other words the flexible film covering the opening of the fluidic channel of the fluidic card to be deformed, the fluidic card must be placed on the card support so as to enable a substantial alignment of the fluidic channel with the control fluidic channel of the card support. This way, a fluid, especially a gas, travelling in the control fluidic channel, can exert a more or less strong pressure according to the desired intensity of opening of the valve, on the flexible film in order to control the opening of the valve. By means of the fluid sprayed on the flexible film it is thus possible to manage switching from the open position to the closed position of the flexible film, and vice versa.

The use of a fluid can enable any damage of the flexible film to be avoided, and can enable the previously described drawbacks related to the use of mechanical parts for actuating the valve to be limited. In the absence of pressurized fluid inlet, in particular pressurized gas, the flexible film remains in its rest position (i.e. without any deformation) and the valve is totally open.

The card support can include a groove, formed on the surface of the card support, and a pressure seal placed in the groove.

The groove can be annular. The pressure seal can be annular (or an O-ring).

The pressure seal can enable the pressure applied to the flexible film to be localized facing the fluidic channel of the fluidic card.

The seal can enable the alignment of the control fluidic channel facing the fluidic channel of the fluidic card to be facilitated and can enable the pressing of the fluidic card on the card support to be facilitated.

The pressure seal can extend outside the fluid flow channel of the opening of the fluidic channel when the fluidic card is in place on the card support.

The object of the invention is also, according to another aspect thereof, a method for controlling at least one valve of a fluidic card implemented by means of an assembly such as previously defined, the valve being constituted by combining the flexible film and the opening of the fluidic channel of the fluidic card of the assembly, wherein controlling the valve is made by varying the pressure of the fluid traveling in the pressure fluidic channel of the card support which contacts the flexible film to enable the deformation thereof.

The control method according to the invention can include any of the previously stated characteristics, taken alone or, according to any technically possible combinations, with other characteristics.

BRIEF DESCRIPTION OF THE DRAWINGS

The invention will be better understood upon reading the following detailed description of non-limiting exemplary embodiments thereof, as well as upon studying the schematic and partial figures of the accompanying drawing, in which.

Throughout these figures, identical references can refer to identical or analogous elements.

Moreover, the different parts represented in the figures are not necessarily drawn to a uniform scale, in order to make the figures more understandable.

DETAILED DISCLOSURE OF PARTICULAR EMBODIMENTS

Figure 1:
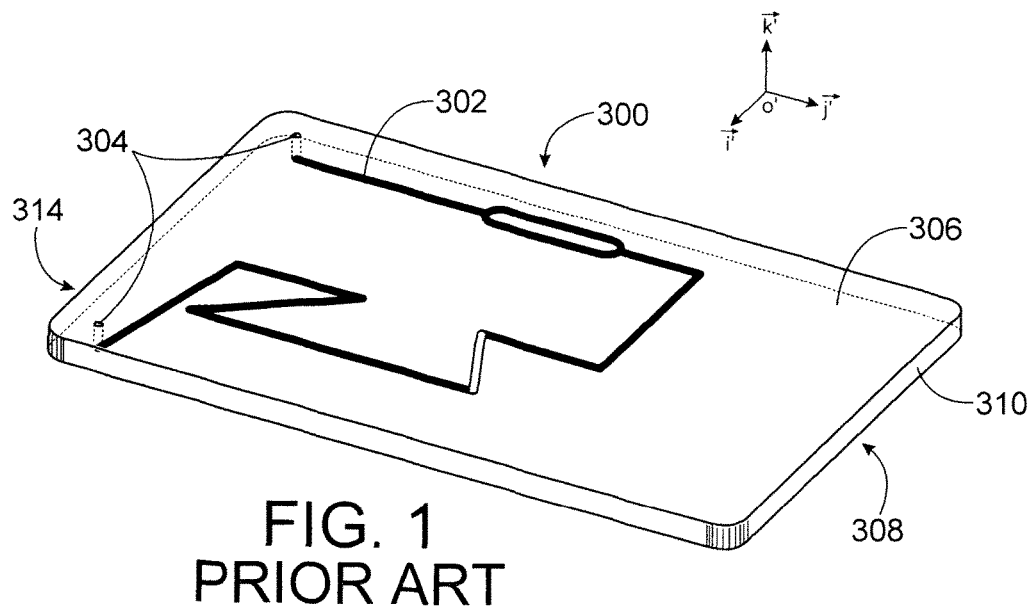
FIG. 1 represents, in a perspective view, an exemplary fluidic card.
Figure 2A:
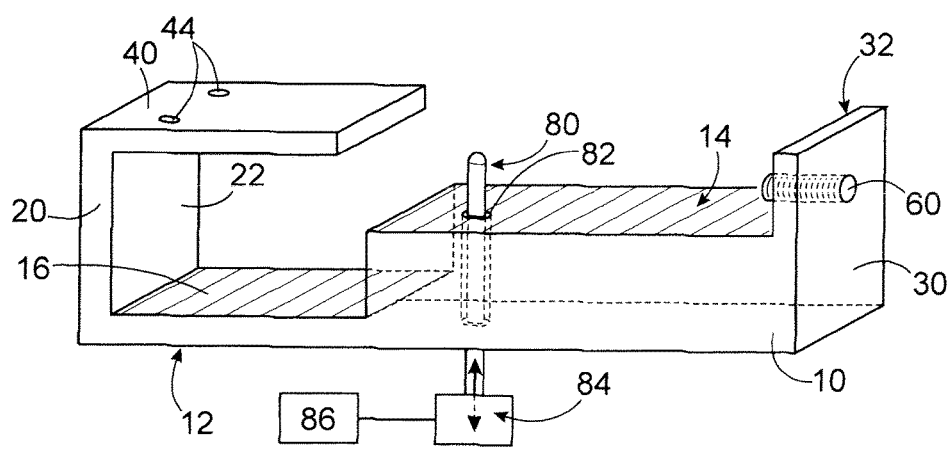
FIGS. 2A and 2B represent, in a perspective view, an exemplary device according to the prior art for connecting a fluidic card to one or more instruments, respectively without and with the presence of the fluidic card.
Figure 2B:
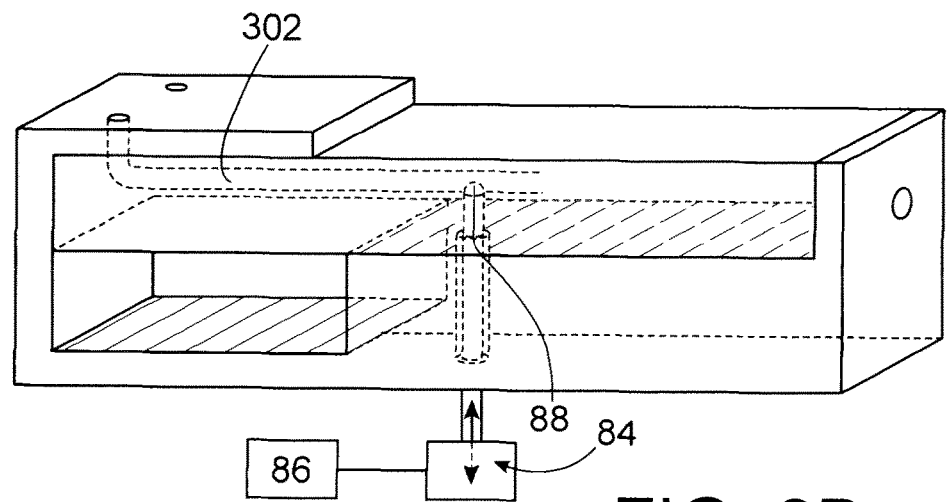

FIGS. 1, 2A and 2B have already been previously described in the part relative to prior art.

Figure 3:
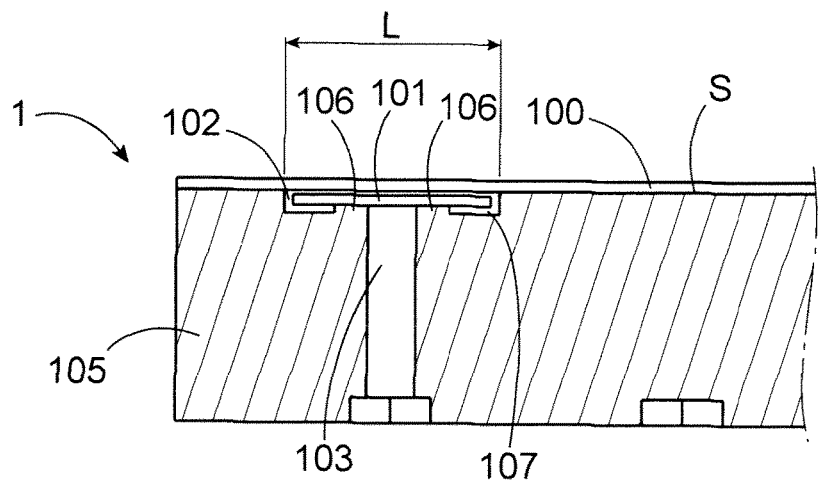
FIG. 3 represents, in a partial cross-section view, an exemplary fluidic card according to the invention.
Figure 4:
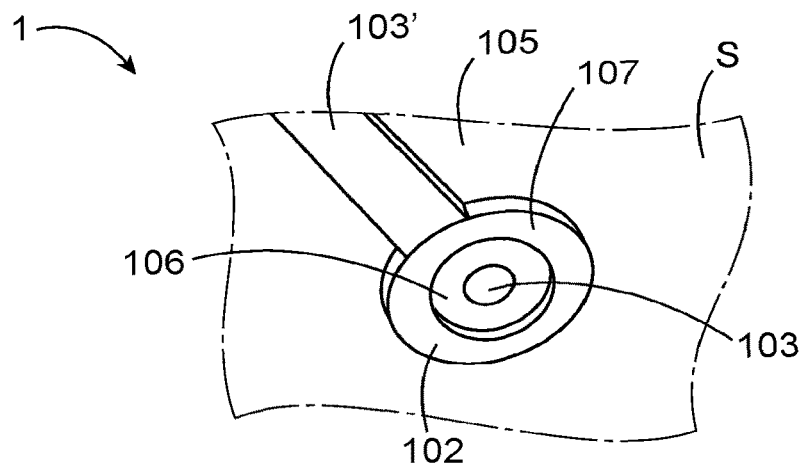
FIG. 4 represents, in a partial perspective view, a detail of an alternative fluidic card according to the invention.
Figure 5:
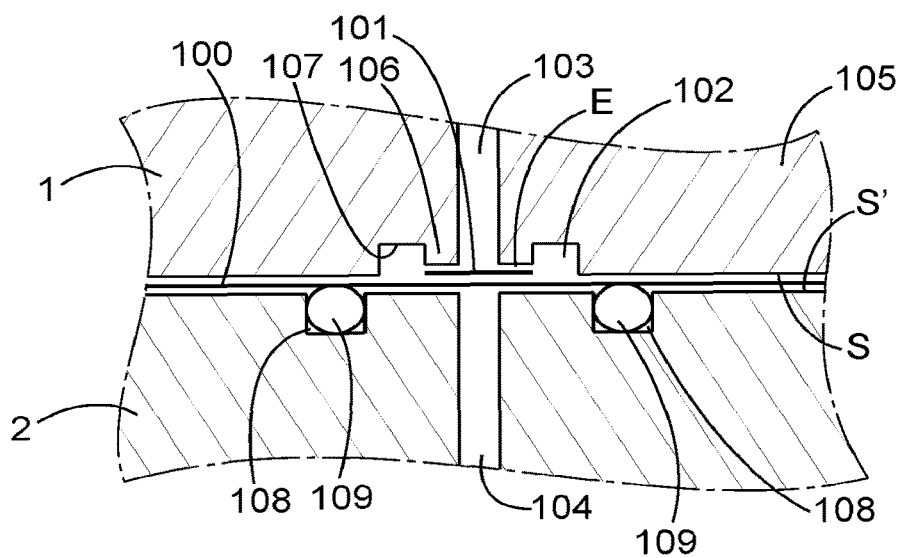
FIG. 5 represents, in a partial cross-section view, an exemplary assembly according to the invention including a fluidic card and a card support.

FIGS. 3 and 4 represent exemplary embodiments of a fluidic card 1 according to the invention, and FIG. 5 an exemplary embodiment of an assembly according to the invention including a fluidic card 1 and a card support 2.

In FIG. 3, the fluidic card 1 includes a rigid support 105 made in a single piece and a fluidic channel 103 formed in the thickness of the rigid support 105.

The fluidic channel 103 includes an opening 102 formed on the outer surface S of the rigid support 105, and the fluidic card 1 further includes a flexible film 100 extending on the outer surface S of the rigid support 105.

The phrase "outer surface" refers to the surface constituting a boundary circumscribing the inside of the card from the outside.

Generally, the fluidic card 1 is substantially parallelepiped. It then includes two outer parallel surfaces, a lower surface and an outside surface, remote by a distance generally lower than 5 cm, and most often 1 cm. These outer surfaces are linked by a curved perpendicular surface, constituting the edge of the card.

The opening 102 has for example a rounded shape and extends along its largest dimension corresponding to its width L substantially parallel to the flexible film 100.

The flexible film 100 can extend on the whole outer surface S of the rigid support 105, or only partially. In every case, the flexible film 100 extends at least on the opening 102 of the fluidic channel 103.

The flexible film 100 is provided to be deformed between a closed position in which it enables the fluidic channel 103 to be closed in order to prevent a fluid flow from the fluidic channel 103 through the opening 102 and an open position in which it allows the presence of a flow space E, which can be seen in FIG. 5, of the fluid of the fluidic channel 103 through the opening 102.

Combining the flexible film 100 and the opening 102 of the fluidic channel 103 constitutes a valve of the fluidic card 1. The deformation of the flexible film 100, especially through an outer means, especially a pneumatic means, such as described later with reference to FIG. 5, can enable this valve to be controlled.

Besides, the fluidic card 1 includes a closing seal 101 which is disposed between the flexible film 100 and the opening 102 of the fluidic channel 103.

The closing seal 101 is for example a flat seal, and it enables a bearing on the opening of the fluidic channel 103 during the deformation of the flexible film 100 towards the closing position.

In FIGS. 3 and 5, the closing seal 101 and the flexible film 100 have not been shown juxtaposed, for the sake of clarity. Nevertheless, the closing seal 101 is advantageously fixed to the flexible film 100, especially by bonding. In particular, fixing the closing seal 101 to the flexible film 100 is made so that the closing seal 101 is placed facing the fluidic channel 103.

Further, as can be seen in FIGS. 3 and 4, the opening 102 of the fluidic channel 103 can include a boss 106 formed all around the fluidic channel 103.

The thus made boss 106 can act as a bearing support for the closing seal 101 during the deformation of the flexible film 100 towards the closing position.

The opening 102 can further include a flow channel 107 for the fluid of the fluidic channel 103 enabling the flow of fluid exiting from the fluidic channel 103 in the opening position of the flexible film 100.

The boss 106 and the flow channel 107 can be made by machining the rigid support 105 of the fluidic card 1. The boss 106 can thus constitute an annular relief around the fluidic channel 103, and the flow channel 107 of the fluid existing from the fluidic channel 103 can be constituted by a cup extending all around the boss 106.

FIG. 4 shows an exemplary embodiment of a fluidic card 1 according to the invention (with the presence neither of the flexible film 100 nor of the closing seal 101), which illustrates the possibility of having another fluidic channel 103' of the fluidic card 1 into which the flow channel 107 comes, out. This other fluidic channel 103' can be formed on the rigid support 105, for example by machining, so as to extend along its largest dimension substantially parallel to the flexible film 100. The flexible film 100 constitutes a wall of the longitudinal fluidic channel 103', the term "longitudinal" referring to the channel extending parallel to the outer surface S.

More generally, the fluidic card 1 can comprise at least one longitudinal fluidic channel 103', made by etching or moulding, or by other method, coming out on the outer surface S of the card. The flexible film 100, deposited on said outer surface S then constitutes a wall of the fluidic channel 103', while enabling, upon deforming, a transverse fluidic channel 103 to be opened and closed.

The term "transversal" refers to the axis of the channel being along the thickness of the card 1, that is the axis of which is not parallel to the outer surfaces S, S'. Thus, the flexible film 100 acts as a wall for a longitudinal channel 103', and as a valve for a transverse channel 103.

FIG. 5 shows an exemplary assembly according to the invention including a fluidic card 1 and a card support 2, able to enable the flexible film 100 to be deformed and on which the fluidic card 1 is intended to be pressed.

The fluidic card 1 of the assembly of FIG. 5 can be for example such as the one shown in FIG. 3 or the one shown in FIG. 4.

As can be seen on this FIG. 5, the card support 2 includes a control fluidic channel 104 which comes out on the surface S' of the card support 2 in which a pressure fluid, and in particular a pressure gas, in able to travel to enable the flexible film 100 of the fluidic card 1 to be deformed.

This way, sending a pressurized gas in the control fluidic channel 104 to contact the flexible film 100 enables the valve of the fluidic card 1 to be controlled, and enables, by varying the intensity of the pressure exerted by the gas on this film 100, switching from an open position to the closed position of the flexible film 100, and vice versa.

It is thus possible to control the operation of the valve of the fluidic card 1 without however being confronted with the drawbacks such as previously described.

Besides, the card support 2 still includes a groove 108, especially an annular groove, formed on the surface S' of the card support 2. A pressure seal 109 is placed in this groove 108. This way, the pressure seal 109 can enable the positioning of the fluidic card 1 with respect to the card support 2 to be facilitated so that an alignment is made between the fluidic channel 103 and the control fluidic channel 104.

Thus, the method for controlling the valve of the fluidic card 1 by means of the assembly described with reference to FIG. 5, consists in varying the pressure of the gas travelling in the pressure fluidic channel 104 of the card support 2, this gas contacting the flexible film 100 so as to enable the flexible film 100 to be deformed and the degree of opening of the fluidic channel 103 to be closed or varied.

Since the flexible film 100 is disposed at the outer surface of the card, it is possible to control the deformation of the film 100 by actuating means transferred on the card support 2, and not inside the card 1. Thus, a same card support 2 can control different cards of the same type, applied in turn on the support 2. The fluidic cards 1, since they are simple to design and inexpensive, are used as disposable consumables.

Of course, the invention is not limited to the exemplary embodiments which have just been described. Various modifications can be brought thereto by those skilled in the art.

The phrase "including a" must be understood as a synonym of "including at least one", unless otherwise specified.

The invention claimed is:

1. An assembly, comprising:
   a card support; and
   a fluidic card, the fluidic card including a rigid support having an outer surface, and a fluidic channel at least partially formed in the rigid support,
   wherein the fluidic channel includes a first end and a second end, the second end including an opening coming out at the outer surface of the rigid support which enables flow of fluid to exit from the fluidic channel at the second end through the opening, wherein the fluidic card further includes a flexible film disposed on the outer surface of the rigid support at least at the opening at the second end of the fluidic channel, the flexible film being reversibly deformable from an initial resting open position that provides a fluid flow space from the fluidic channel through the opening for a fluid flow therethrough, to a deformed closed position that prevents the fluid flow from the fluidic channel through the opening, and wherein the outer surface of the rigid support constitutes an outer surface of the fluidic card and defines a boundary delineating an inside of the fluidic card from an exterior of the fluidic card, wherein the opening of the fluidic channel includes a boss formed around the opening of the fluidic channel, wherein a channel is formed adjacent to and around a circumference of the boss for flow of fluid from the fluidic channel enabling a flow of the fluid exiting from the fluidic channel in the open position of the flexible film, and wherein the channel is formed as a groove in the rigid support, wherein a top surface of the boss and a bottom surface of the groove are both located below the outer surface of the rigid support, wherein the card support includes a control fluidic channel having one end coming out on a surface of the card support in which a pressure fluid can travel to enable the flexible film of the fluidic card to be deformed, and wherein a longitudinal axis of the control fluidic channel of the card support is collinear with a longitudinal axis of the fluidic channel of the fluidic card.

2. The assembly according to claim 1, wherein the opening of the fluidic channel extends along its largest dimension parallel to the flexible film.

3. The assembly according to claim 1, further comprising a closing seal disposed between the flexible film and the opening of the fluidic channel.

4. The assembly according to claim 3, wherein the closing seal is secured to the flexible film.

5. The assembly according to claim 1, wherein the card support is configured to enable the flexible film to be deformed and on which the fluidic card can be pressed.

6. The assembly according to claim 5, wherein the card support includes a groove, formed on a surface of the card support, and a pressure seal placed in the groove.

7. A method for controlling at least one valve of a fluidic card implemented by an assembly according to claim 1, the valve being constituted by combining the flexible film and the opening of the fluidic channel of the fluidic card of the assembly, comprising:

controlling the valve by varying a pressure of a fluid traveling in a pressure fluidic channel of the card support, which contacts the flexible film, wherein the fluid contacting the flexible film deforms the flexible film.

* * * * *